(12) United States Patent
Wellbrook

(10) Patent No.: US 6,400,477 B1
(45) Date of Patent: *Jun. 4, 2002

(54) OPTICAL CROSS-CONNECT (OXC) NETWORK CONNECTIVITY

(75) Inventor: Glenn Wellbrook, Wylie, TX (US)

(73) Assignee: WorldCom, Inc., Clinton, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,214

(22) Filed: Sep. 9, 1997

(51) Int. Cl.[7] .............................. H04J 14/00; H04J 4/00; H04J 14/02; H04B 10/08
(52) U.S. Cl. ........................ 359/117; 359/117; 359/110; 359/123; 359/124; 359/127; 359/139
(58) Field of Search ................................ 359/110, 117, 359/172, 123, 124

(56) References Cited

U.S. PATENT DOCUMENTS

| | | | | |
|---|---|---|---|---|
| 5,303,077 A | * | 4/1994 | Bottle et al. ................. | 359/123 |
| 5,434,691 A | * | 7/1995 | Yamane ........................ | 359/117 |
| 5,457,555 A | * | 10/1995 | Moriyama ................... | 359/110 |
| 5,457,556 A | * | 10/1995 | Shiragaki ..................... | 359/117 |
| 5,550,818 A | * | 8/1996 | Brackett et al. .............. | 370/60 |
| 5,717,796 A | * | 2/1998 | Clendening ................... | 385/24 |
| 5,731,887 A | * | 3/1998 | Fee .............................. | 359/110 |
| 5,870,216 A | * | 2/1999 | Brock et al. ................. | 359/172 |
| 6,005,694 A | * | 12/1999 | Liu .............................. | 359/110 |

\* cited by examiner

*Primary Examiner*—Jason Chan
*Assistant Examiner*—M. R. Sedighian

(57) ABSTRACT

An optical network includes a first optical cross-connect with a plurality of input ports and a plurality of output ports and a plurality of working channel optical transmitters and a second optical cross-connect with a plurality of input ports and a plurality of output ports and a plurality of working channel optical receivers. The first and second optical cross-connects are interconnected by a primary route and a secondary route. The network includes a protection channel optical transmitter and a protection channel optical receiver. The protection channel transmitter and receiver are adapted to transmit and receive signals in the event of a working channel transmitter or receiver failure.

21 Claims, 2 Drawing Sheets

OPTICAL CROSS-CONNECT (OXC) NETWORK CONNECTIVITY

FIELD OF THE INVENTION

The present invention relates generally to communications systems and networks, and more particularly to systems and methods for providing facility and equipment protection and restoration services in optical networks.

DESCRIPTION OF THE PRIOR ART

Modern digital telecommunications systems are built upon a hierarchical network. The network consists of a plurality of nodes or sites that are interconnected by transmission facilities. Generally, lower bandwidth level demands are multiplexed into higher bandwidth demands. For example, up to twenty-eight 1.544 Mbps DS1 channels can be multiplexed into a single 4.376 Mbps DS3 channel. Similarly, up to twelve DS3 channels can be multiplexed into a single 622.08 Mbps OC12 channel. Finally, up to sixteen OC12 channels can be multiplexed into a single 9.953 Gbps OC192 channel. Since a DS1 channel can carry up to twenty four telephone conversations, a single OC192 channel can carry over one hundred thousand telephone conversations.

A telecommunications network consists of equipment, which includes transmitters, receivers, and switches, and facilities, which includes the physical transport medium and regeneration and restoration devices. Because of the tremendous volume of calls carried on each channel, it is necessary, in the event of a facility or equipment failure, that service is not interrupted for any significant amount of time.

Typical communications networks have a mesh topology, in which there are alternative paths through the network between nodes. Accordingly, when there is a facility failure, as for example, when an optical fiber is cut, there is a separate path to which the traffic on the cut fiber can be switched. Today, when a cut occurs, traffic is rerouted at the DS3 level through other sites so that the origin and destination are again connected. Since one OC192 fiber connection includes 192 DS3 electrical connections, tremendous broadband digital cross-connect port capacity is required for restoration. Also, switching at the DS3 level is relatively slow.

Accordingly, it is an object of the present invention to provide protection and restoration services in the optical layer of an optical network.

SUMMARY OF THE INVENTION

An optical network according to the present invention includes a first optical cross-connect with a plurality of input ports and a plurality of output ports. The network includes a plurality of working channel optical transmitters, each including an optical signal output connected to an input port of the first optical cross-connect and a signal input. Each of the working channel optical transmitters is adapted to transmit an optical signal in a unique wavelength channel. The first optical cross-connect includes an optical measurement device at each of its input ports to sense a loss of signal at any of its input ports.

The network also includes a second optical cross-connect with a plurality of input ports and a plurality of output ports. The second optical cross-connect includes an optical measurement device at each of its input ports to sense a loss of signal at any of its input ports. A plurality of working channel optical receivers, each including an optical signal input, are connected to output ports of the second optical cross-connect. Each of the working channel receivers is adapted to receive an optical signal on one of the working channels.

The first and second optical cross-connects are interconnected by a primary route and a secondary route. The primary and secondary routes each include a wavelength division multiplexer and a wavelength division demultiplexer. Each wavelength division multiplexer includes plurality of optical inputs and one optical output. Each wavelength division demultiplexer includes one optical input and a plurality of optical outputs. The output of each multiplexer is connected to the input of a demultiplexer by optical fiber.

The network includes at least one protection channel optical transmitter that includes a signal input and an optical signal output, and a protection channel optical receiver including an optical signal input and a signal output. The optical signal output of the protection channel transmitter is connected to the first optical cross-connect and the optical signal input of the protection channel receiver is connected to the second optical cross-connect. The protection channel is adapted to carry signals in the event of a working channel transmitter or receiver failure.

In one embodiment of the present invention, the protection channel transmitter and receiver are connected transmit the protection channel on a unique wavelength over the secondary route. The secondary route includes amplification stations, each of which includes a regenerator dedicated to the protection channel. In the event of failure of the primary route, the signal of one of the working channels is transmitted on the protection channel and optical cross-connects are operated to switch the other working channels from the primary routee to the secondary route.

In an alternative embodiment of the present invention, the protection channel occupies a unique wave length, but the network includes means for converting the wavelength of the protection channel to the wavelength of a failed working channel transmitter. Transmitter and receiver are connected to the primary route through the first and second optical cross-connects, respectively.

The network includes a first protection switch controller associated with the first optical cross-connect, and a second protection switch controller associated with second first optical cross-connect. The first protection switch controller is in communication with the first optical cross-connect, the working channel transmitters, and the protection channel transmitter through a local area network. Similarly, the second protection switch controller is in communication with the second optical cross-connect, the working channel receivers, and the protection channel receiver through a local area network. The protection switch controllers are in communication with each other through a wide area network.

The protection switch controllers monitor the network for failures and take action to correct detected failures. For example, when an optical measurement device at an input port of the first optical cross-connect detects a loss of signal, which indicates the failure of a working channel transmitter, the first protection switch controller switches the input signal from the failed transmitter to the protection channel transmitter and notifies the second protection switch controller of the switch. When a loss of signal or an alarm indication signal is detected at the receiving end of the network, the second protection switch controller operates the second optical cross-connect to connect the working channel receivers to the secondary route and notifies the first protection switch controller to operate the first optical cross-connect to switch the working channel transmitters to the secondary route.

In the alternative embodiment of the invention, the protection switch controllers each include an optical signal input connected to an output port of its associated cross-connect and an optical signal output connected to an input port of the cross-connect. Each protection switch controller includes a frequency converter that converts optical signals between the wavelength of the protection channel and the wavelength of a failed channel.

When the first protection switch controller detects a working channel transmitter failure, the first protection switch controller switches the input signal from the failed transmitter to the protection channel transmitter and operates the first optical cross-connect to switch the output of the protection channel transmitter to the optical input of the protection switch controller. The first protection switch controller converts the wavelength of the signal to that of the failed transmitter channel and operates the first optical cross-connect to connect the output of the first protection switch controller to the primary route.

DESCRIPTION OF THE PREFERRED EMBODIMENT

Figure 1:
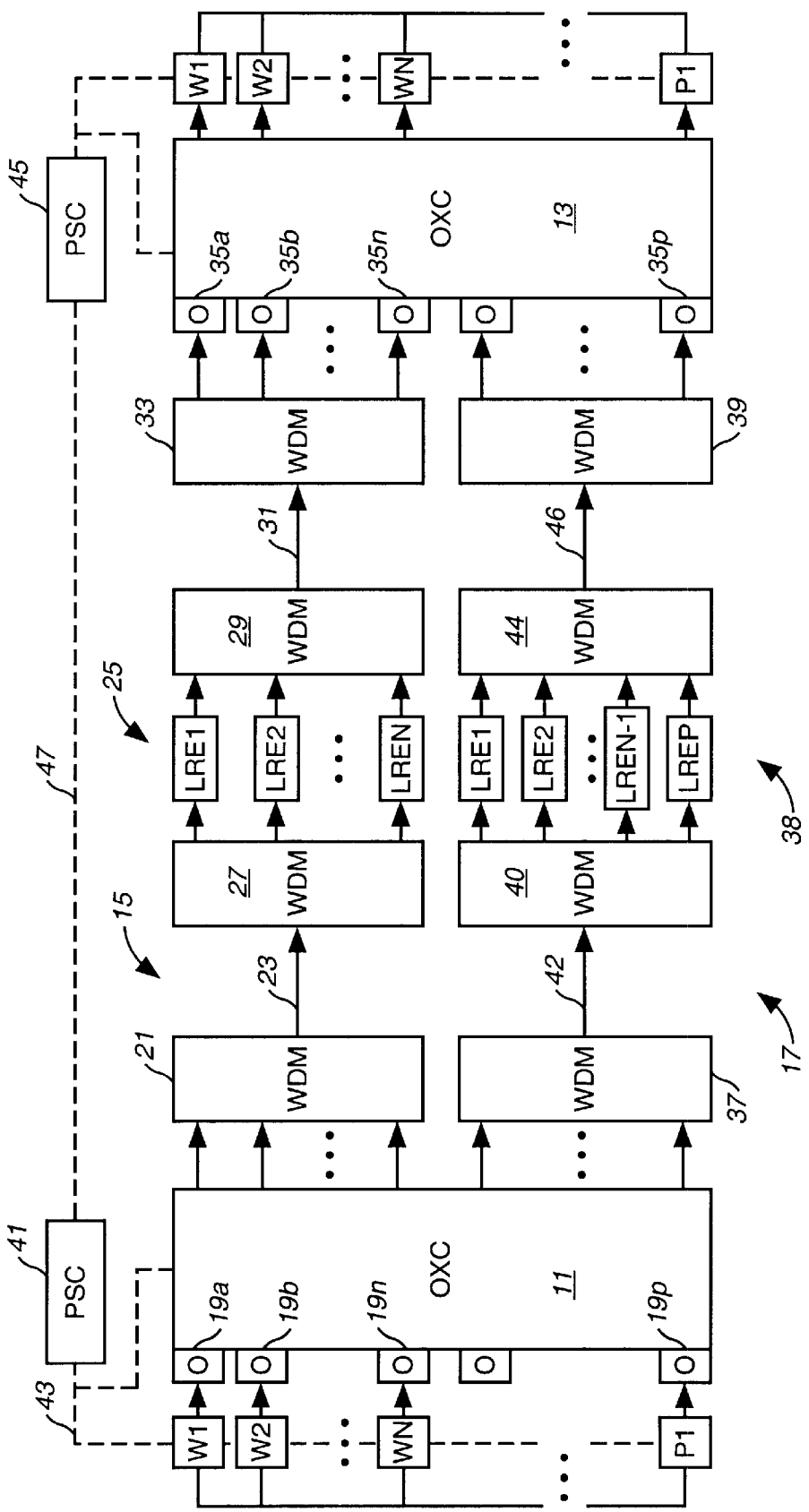
FIG. 1 is a block diagram of one embodiment of a system according to the present invention.

Referring now to the drawings, a portion of an optical network is illustrated in FIG. 1. The network of FIG. 1 includes a first optical cross-connect 11 and a second optical cross-connect 13. Optical cross-connects 11 and 13 are interconnected by a plurality of optical transmission routes, including a primary route, designated generally by the numeral 15, and a secondary route, designated generally by the numeral 17. Routes 15 and 17 may be routed along the same path or they may be diversely routed, according to the design of the network.

The network includes a plurality N of working channel transmitters that transmit working channels W1–WN. Each working channel is transmitted on a different optical wavelength. The optical outputs of working channels W1–WN are received at optical cross-connect 11. Each optical input port of optical cross-connect 11 includes an optical measurement device 19 that is adapted to detect a loss of signal on any one of working channels W1–WN.

Optical cross-connect 11 includes a plurality of output ports. A number of output ports corresponding to the number of working channels W1–WN are connected to a wavelength division multiplexer 21. Wavelength division multiplexer 21 receives the optical signals on working channels W1–WN and multiplexes them into a single optical channel, which it outputs onto an optical fiber 23, which is part of primary route 15.

Primary route 15 includes a plurality of line amplifier stations, including a line amplification station designated generally by the numeral 25. Line amplification station 25 includes a wavelength division demultiplexer 27, which receives the optical signal from optical fiber 23 and demultiplexes it into N individual signals corresponding to working channels W1–WN. The working channels are received by a corresponding plurality N of line regenerators or repeaters LRE1–LREN. The line regenerators convert the signal from the optical domain to the electrical domain, reshape and retime the electrical signal, and retransmits the signal by converting it from the electrical domain back to the optical domain. The optical outputs of LRE1–LREN are received at a wavelength division multiplexer 29 and multiplexed into a single composite optical signal for transmission on an optical fiber 31. Those skilled in the art will recognize that an optical transmission path typically includes several line amplification stations 25. However, for purposes of illustration, only one line amplification station 25 is shown.

The optical signal on fiber 31 is received at a wavelength division demultiplexer 33 associated with second optical cross-connect 13. Wavelength division demultiplexer 33 demultiplexes the optical signal into a plurality of signals corresponding to channels W1–WN, which are received at optical input ports 35 of optical cross-connect 13. Second optical cross-connect 13 outputs working channels W1–WN to a plurality of working channel receivers, each of which includes an optical signal input and a signal output.

The network of FIG. 1 includes, in addition to the working channel transmitters associated with working channels W1–WN, a protection channel transmitter, which transmits a protection channel P1. P1 is transmitted on a unique wavelength that is different from the wavelengths of working channels W1–WN. As will be explained in detail hereinafter, in the event of an equipment or facility failure, protection channel P1 is adapted to carry the traffic of one of working channels W1–WN.

Secondary route 17 includes a wavelength division multiplexer 37 connected to optical cross-connect 11, and a wavelength division demultiplexer 39 connected to second optical cross-connect 13. Secondary route 17 also includes a plurality of line amplifier stations, including a line amplification station designated generally by the numeral 38.

Line amplification station 38 is similar to line amplification station 25 in that it includes a wavelength division demultiplexer 40, which receives the optical signal from an optical fiber 42, and a wavelength division multiplexer 44, which multiplexes individual channels onto an optical fiber 46. Line amplification station 38 includes a plurality N of regenerators; however, in the preferred embodiment, N−1 of the regenerators (LRE1–LRE(N−1)) of line amplification station 38 regenerate the signals of working channels W1–W (N−1), respectively, and one regenerator LREP regenerates the signal of protection channel P1. Thus, according to the present invention, in the event of a failure of a working channel transmitter, the traffic of that transmitter is transferred to protection channel P1 where it is carried to its destination on secondary route 17. In the event of failure along primary route 15, as for example a cut of optical fiber 23 or 31, the traffic of working channel WN is transmitted on protection channel P1 and the signals of working channels W1–W(n−1) is switched by optical cross-connect 11 from primary route 15 to secondary route 17.

The network of FIG. 1 includes a first protection switch controller 41. First protection switch controller 41 is associated with first optical cross-connect 11, the working channel transmitters, and the protection channel transmitter by means of a local area network 43. First protection switch controller 41 receives failure indications from first optical cross-connect 11 and the transmitters and sends switching instructions to the transmitters and optical cross-connect 11 over LAN 43. Similarly, a second protection switch controller 45 is associated with second optical cross-connect 13 and the receivers. Protection switch controllers 41 and 45 communicate with each other by means of a wide area network 47.

Protection switch controllers 41 and 45 provide equipment protection and facility restoration services to the network of FIG. 1. Protection switch controllers 41 and 45 receive failure indications and they include logic for operating network devices to correct the problem. For example, in the event of a transmitter failure, a loss of signal is detected at one of optical measurement devices 19 of first optical cross-connect 11. When a loss of signal is detected at one of the regenerators LRE1–LREN, the detecting regenerator transmits an alarm indication signal, which is received at one of the receivers. For example, if the transmitter associated with working channel W1 becomes inoperative, a loss of signal will be received at optical measurement device 19a and an alarm indication signal will be received at the receiver associated with working channel W1. The loss of signal will be reported to first protection switch controller 41 and the alarm indication signal will be reported to second protection switch controller 45. First protection switch controller 41 will switch the input signal for working channel W1 to protection channel P1 and signal second protection switch controller 45 that the switch has occurred.

In the event of a failure between first optical cross-connect 11 and line amplifier 25, as for example, a cut in optical fiber 23, each regenerator LRE1–LREN, will experience a loss of signal and will, in turn, transmit an alarm indication signal. The alarm indication signals will be received at each receiver for working channels W1–WN, which they will report to second protection switch controller 45. Second protection switch controller 45 will operate second optical cross-connect 13 to switch the receivers associated with working channels W1–W(N−1) from the outputs of wavelength division demultiplexer 33 to the outputs of wavelength division demultiplexer 39. Substantially simultaneously, second protection switch controller 45 will signal first protection switch controller 41 to switch the working channel WN input to the protection channel P1 transmitter and switch the outputs from the transmitters associated with working channels W1–W(N−1) from wavelength division multiplexer 21 to wavelength division multiplexer 37, thereby restoring service in the network.

Figure 2:
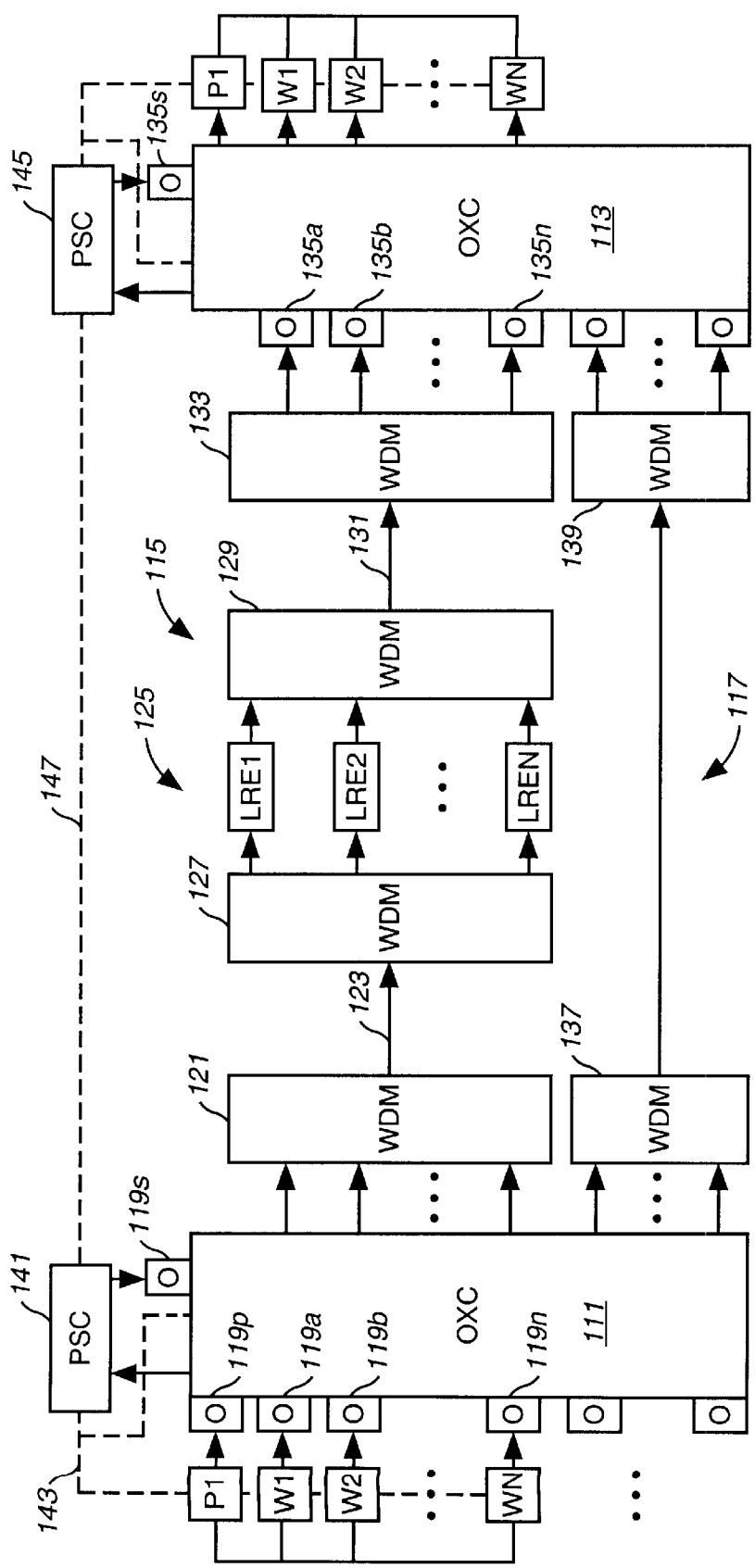
FIG. 2 is a block diagram of an alternative embodiment of a system according to the present invention.

Referring now to FIG. 2, a portion of an optical network according to an alternative embodiment of the present invention is illustrated. The network of FIG. 2 includes a first optical cross-connect 111 and a second optical cross-connect 113. Optical cross-connects 111 and 113 are interconnected by a plurality of optical transmission routes, including a primary route, designated generally by the numeral 115, and a secondary route, designated generally by the numeral 117.

The network includes a plurality of working channel transmitters that transmit working channels W1–WN. Each working channel is transmitted on a different optical wavelength. The optical outputs of working channels W1–WN are received at optical cross-connect 111. Each optical input port of optical cross-connect 111 includes an optical measurement device 119 that is adapted to detect a loss of signal on any one of working channels W1–WN.

Optical cross-connect 111 includes a plurality of output ports. A number of output ports corresponding to the number of working channels W1–WN are connected to a wavelength division multiplexer 121. Wavelength division multiplexer 121 receives the optical signals on working channels W1–WN and multiplexes them into a single optical channel, which it outputs onto an optical fiber 123, which is part of primary route 115.

Primary route 115 includes a plurality of line amplifier stations, including a line amplifier station designated generally by the numeral 125. Line amplifier station 125 includes a wavelength division demultiplexer 127, which receives the optical signal from optical fiber 123 and demultiplexes it into a plurality of individual signals corresponding to working channels W1–WN. The working channels are received by a corresponding plurality of line regenerators or repeaters LRE1–LREN. The line regenerators convert the signal from the optical domain to the electrical domain, reshape and retime the electrical signal, and retransmits the signal by converting it from the electrical domain back to the optical domain. The optical outputs of LRE1–LREN are received at a wavelength division multiplexer 129 and multiplexed into a single composite optical signal for transmission on an optical fiber 131. Those skilled in the art will recognize that an optical transmission path typically includes several line amplification stations 125. However, for purposes of illustration, only one line amplification station 125 is shown.

The optical signal on fiber 131 is received at a wavelength division demultiplexer 133 associated with second optical cross-connect 113. Wavelength division demultiplexer 133 demultiplexes the optical signal into a plurality of signals corresponding to channels W1–WN, which are received at optical input ports 135 of optical cross-connect 113. Second optical cross-connect 113 outputs working channels W1–WN to a plurality of working channel receivers, each of which includes an optical signal input and a signal output.

Secondary route 117 includes a wavelength division multiplexer 137 connected to optical cross-connect 111, and a wavelength division demultiplexer 139 connected to second optical cross-connect 113. Secondary route 117 also includes line amplification stations, which include regenerators LRE1–LREN but are not shown for purposes of clarity.

The network of FIG. 2 includes, in addition to the working channel transmitters associated with working channels W1–WN, a protection channel transmitter, which transmits a protection channel P1. P1 is transmitted on a unique wavelength that is different from the wavelengths of working channels W1–WN. Protection channel P1 is received at a port 119p of first optical cross-connect 111. The receivers at second optical cross-connect 113 include a protection channel receiver, which is adapted to receive protection channel P1 from second optical cross-connect 113. It will be noted in FIG. 2 that the optical signal of protection channel P1 goes through optical cross-connects 111 or 113, rather than directly into and out of primary route 115 directly through wavelength division multiplexer 121 and wavelength division demultiplexer 133, as in the embodiment of FIG. 1. It will be further noted that line amplification station 125 of FIG. 2 does not include a separate line regenerator for protection channel P1. Rather, line amplification station 125 includes only as many line regenerators LRE1–LREN as there are working channels W1–WN.

The network of FIG. 2 includes a first protection switch controller 141. First protection switch controller 141 is associated with first optical cross-connect 111, the working channel transmitters, and the protection channel transmitter by means of a local area network 143. First protection switch controller 141 receives failure indications from first optical cross-connect 111 and the transmitters and sends switching instructions to the transmitters and optical cross-connect 111 over LAN 143. Similarly, a second protection switch controller 145 is associated with second optical cross-connect 113 and the receivers. Protection switch controllers 141 and 145 communicate with each other by means of a wide area network 147.

Each protection switch controller 141 and 145 includes optical frequency conversion means, which are not shown but are generally well known to those skilled in the art. First protection switch controller 141 has means for converting an optical signal in the wavelength protection channel P1 to an optical signal in the wavelength of a selected one of working channels W1–WN. Similarly, second protection switch controller 145 has means for converting an optical signal in the wavelength of working channels W1–WN to an optical signal in the wavelength of protection channel P1.

First protection switch controller 141 has an optical input connected to an output port of first optical cross-connect 111, and an optical output connected to an input port 119s of first optical cross-connect 111. Similarly, second protection switch controller 145 has an optical input connected to an output port of second optical cross-connect 113, and an optical output connected to an input port 135s of second optical cross-connect 113.

Protection switch controllers 141 and 145 provide equipment protection and facility restoration services to the network of FIG. 2. Protection switch controllers 141 and 145 receive failure indications and they include logic for operating network devices to correct the problem. For example, in the event of a transmitter failure, a loss of signal is detected at one of optical measurement devices 119a–119n of first optical cross-connect 111. When a loss of signal is detected at one of the regenerators LRE1–LREN, the detecting regenerator transmits an alarm indication signal, which is received at one of the receivers. For example, if the transmitter associated with working channel W1 becomes inoperative, a loss of signal will be received at optical measurement device 119a and an alarm indication signal will be received at the receiver associated with working channel W1. The loss of signal will be reported to first protection switch controller 141 and the alarm indication signal will be reported to second protection switch controller 145. First protection switch controller 141 will switch the input signal for working channel W1 to protection channel P1. First protection switch controller 141 will operate first optical cross-connect 111 connect P1 to first protection switch controller 141, which will convert the wavelength of the P1 signal to the wavelength of the W1 channel. Additionally, first protection switch controller 141 will operate first optical cross-connect 111 connect input port 119s to wave division multiplexer 121. The protection channel signal will be received at the working channel W1 receiver in the normal way.

In the event of a failure between first optical cross-connect 111 and line amplifier 125, as for example, a cut in optical fiber 123, each regenerator LRE1–LREN, will experience a loss of signal and will, in turn, transmit an alarm indication signal. The alarm indication signals will be received at each receiver for working channels W1–WN, which they will report to second protection switch controller 145. Second protection switch controller 145 will operate second optical cross-connect 113 to switch the receivers associated with working channels W1–WN from the outputs of wavelength division demultiplexer 133 to the outputs of wavelength division demultiplexer 139. Substantially simultaneously, second protection switch controller 145 will signal first protection switch controller 141 to switch the outputs from the transmitters associated with working channels W1–WN from wavelength division multiplexer 121 to wavelength division multiplexer 137, thereby restoring service in the network.

Similarly, if a failure occurs between line amplifier 125 and second optical cross-connect 113, a loss of signal will be reported at each optical measurement device 135a–135n. Again, protection switch controllers 141 and 145 will operate optical cross-connects 111 and 113, respectively, to switch working channels W1–WN from primary route 115 to secondary route 117.

What is claimed is:

1. An optical network comprising:
    a first optical cross-connect including a plurality of input ports and a first and second plurality of output ports;
    a plurality of working channel optical transmitters, each of said working channel optical transmitters including a signal input, and an optical signal output connected to an input port of said first optical cross-connect, each of said working channel optical transmitters having a unique wavelength;
    a protection channel optical transmitter including a signal input and an optical signal output connected to said first optical cross-connect;
    a second optical cross-connect including a plurality of input ports and a plurality of output ports;
    a first protection switch controller associated with said first optical cross-connect;
    a second protection switch controller associated with said second optical cross-connect;
    a plurality of working channel optical receivers, each of said working channel optical receivers including an optical signal input connected to an output port of said second optical cross-connect, and a signal output;
    a protection channel optical receiver including an optical signal input connected to an output port of said second optical cross-connect and a signal output;
    a first multiplexer connected to said first plurality of output ports of said first optical cross-connect;
    a second multiplexer connected to said second plurality of output ports of said first optical cross-connect, wherein one of said second plurality of output ports corresponds to said protection channel;
    a primary route connecting said first and second optical cross-connects, wherein said primary route is connected to said first multiplexer; and
    a secondary route connecting said first and second optical cross-connects, wherein said secondary route is connected to said second multiplexer.

2. The optical network as claimed in claim 1, including means for detecting a failure of one of said working channel optical transmitters.

3. The optical network as claimed in claim 2, wherein said failure detecting means includes an optical measurement device associated with the optical signal output of each of said working channel optical transmitters.

4. The optical network as claimed in claim 2, wherein said failure detecting means includes an optical measurement device associated with each input port of said first optical cross-connect.

5. The optical network as claimed in claim 2, including means for switching the input signal of a failed working channel optical transmitter to the signal input of said protection channel optical transmitter.

6. The optical network as claimed in claim 5, including means for converting the wavelength of said protection channel to the wavelength of the failed working channel.

7. The optical network as claimed in claim 1, wherein said protection channel transmitter and said protection channel receiver are connected to said secondary route through said first and second cross-connects, respectively.

8. The optical network as claimed in claim 7, wherein:
    said optical network includes N working channel optical transmitters;

said primary route includes at least one line amplification station, each said amplification station including a line regenerator for each of said N working channels; and, said secondary route includes at least one line amplification station, each amplification station of said secondary route including one line regenerator for each of N−1 working channels, and one line generator for said protection channel.

9. The optical network as claimed in claim 1, including means for detecting a failure of said primary route.

10. The optical network as claimed in claim 9, including means for operating said first and second cross-connects to switch the working channels to the secondary route.

11. The optical network as claimed in claim 9, including:
means for operating said first and second cross-connects to switch N−1 of said working channels to said secondary route; and,
means for switching the input signal of one of said working channel optical transmitters to the signal input of said protection channel optical transmitter.

12. The optical network as claimed in claim 1, wherein each of said protection switch controllers includes:
an optical input connected to an output port of its associated optical cross connect;
an optical output connected to an input port of its associated optical cross-connect; and,
means for converting a first wavelength signal received at its input to a second wavelength signal at its output.

13. The optical network as claimed in claim 12, including means for switching the input signal of a failed working channel optical transmitter to said protection channel optical transmitter, and wherein said first protection switch controller includes:
means for operating said first optical cross-connect to connect the optical signal output of said protection channel optical transmitter to said optical signal input of said first protection switch controller; and,
means for operating said first optical cross-connect to connect the optical signal output of said first protection switch controller to said primary route.

14. The optical network as claimed in claim 13, including means for detecting a failure on a channel between said second optical cross-connect and one of said working channel optical receivers.

15. The optical network as claimed in claim 14, wherein said second protection switch controller includes:
means for operating said second optical cross-connect to switch the optical signal output of the failed working channel from said one working channel optical receiver to said optical signal input of said second protection switch controller; and,
means for operating said second optical cross-connect to connect the optical signal output of said second protection switch controller to the optical signal input of said protection channel optical receiver.

16. An optical communication system, which comprises:
a plurality of working channel optical transmitters, each of said working channel transmitters including a signal input and an optical signal output, each of said working channel optical transmitters including means for transmitting an optical signal on a unique working channel wavelength;
at least one protection channel optical transmitter, said protection channel transmitter including a signal input, an optical signal output, and means for transmitting an optical signal on a unique protection channel wavelength;

a first optical cross-connect having a plurality of optical input ports and a plurality of optical output ports, wherein the optical signal outputs of said optical transmitters are connected to said optical input ports of said first optical cross-connect, and wherein each of said optical input ports includes an optical measurement point;
a first wavelength division multiplexer having a plurality of optical inputs connected to output ports of said first optical cross-connect and one optical output;
a second wavelength division multiplexer having a plurality of optical inputs connected to output ports of said first optical cross-connect and one optical output;
a first protection switch controller, said first protection switch controller including an optical input connected to an output port of said first optical cross-connect and an optical output connected to an optical input port of said first optical cross-connect, said first protection switch controller including means for converting an optical signal on said protection channel wavelength to a selected one of said working channel wavelengths and for switching a plurality of optical output ports of said optical first cross-connect, that correspond to the optical input ports of said optical transmitters, from said inputs of said first multiplexer to said inputs of said second multiplexer.

17. The system as claimed in claim 16, wherein said first protection switch controller includes means, responsive to detection of a loss of signal at an optical measurement device at an input port of said optical cross-connect indicating a failure of one of said working channel transmitters, for
switching the input of said failed working channel transmitter to the input of said protection channel transmitter,
operating said first optical cross-connect to disconnect said failed working channel transmitter from said first wavelength division multiplexer,
operating said first optical cross-connect to connect said protection channel transmitter to said first protection switching controller,
converting the optical signal in said protection channel wavelength to an optical signal in said failed working channel wavelength,
operating said first optical cross-connect to connect said first protection controller to said first wavelength division multiplexer.

18. The system as claimed in claim 17, including
a plurality of working channel optical receivers, each of said working channel receivers including an optical signal input and a signal output, each of said working channel optical receivers including means for receiving an optical signal on one of said working channel wavelengths;
at least one protection channel optical receiver, said protection channel receiver including an optical signal input, a signal output, and means for receiving an optical signal on said protection channel wavelength;
a second optical cross-connect having a plurality of optical input ports and a plurality of optical output ports, wherein the optical signal inputs of said optical receivers are connected to said optical output ports of said second optical cross-connect, and wherein each of said optical input ports includes an optical measurement device;

a first wavelength division demultiplexer having a plurality of optical outputs connected to input ports of said second optical cross-connect and one optical input;

an optical transmission route including an optical fiber connected to said optical output of said first wavelength division multiplexer and an optical fiber connected to the optical input of said first wavelength division demultiplexer; and, a second protection switch controller, said second protection switch controller including an optical input connected to an output port of said second optical cross-connect and an optical output connected to an optical input port of said second optical cross-connect, said second protection switch controller including means for converting an optical signal on a selected one of said working channel wavelengths to said protection channel wavelength.

19. The system as claimed in claim 18, including:

a second wavelength division demultiplexer having a plurality of optical outputs connected to input ports of said second optical cross-connect and one optical input; and a secondary optical transmission route including an optical fiber connected to said optical output of said optical wavelength division multiplexer and an optical fiber connected to the optical input of said second wavelength division demultiplexer.

20. The system as claimed in claim 19, wherein said second protection switch controller includes means, responsive to detection of a loss of signal at each of said optical measurement devices at the ports of said second optical cross-connect connected to said first wavelength division demultiplexer, for:

switching the optical outputs of said second wavelength division demultiplexer to the optical inputs of said optical receivers; and, signaling said first protection switch controller to switch the optical outputs of said optical transmitters to the optical inputs of said second wavelength division multiplexer.

21. The system as claimed in claim 19, wherein said second protection switch controller includes means, responsive to detection of an alarm indication signal at each of said working channel receivers, for:

switching the optical outputs of said second wavelength division demultiplexer to the optical inputs of said optical receivers; and, signaling said first protection switch controller to switch the optical outputs of said optical transmitters to the optical inputs of said second wavelength division multiplexer.

* * * * *